United States Patent [19]

Risi

[11] Patent Number: 4,632,238
[45] Date of Patent: Dec. 30, 1986

[54] APPARATUS FOR ARRANGING ONCOMING ARTICLES, IN PARTICULAR CONTAINERS, INTO PLURAL ARTICLE ROWS

[75] Inventor: Roberto Risi, Casalecchio di Reno, Italy

[73] Assignee: MA.CO Engineering S.r.l., Bologna, Italy

[21] Appl. No.: 608,002

[22] Filed: May 7, 1984

[30] Foreign Application Priority Data

May 10, 1983 [IT] Italy .................................. 3417 A/83

[51] Int. Cl.⁴ ............................................. B65G 47/26
[52] U.S. Cl. ..................................... 198/365; 198/440
[58] Field of Search ............... 198/440, 365, 627, 626, 198/817, 474.1, 475.1

[56] References Cited

U.S. PATENT DOCUMENTS

| | | | |
|---|---|---|---|
| 2,579,631 | 12/1951 | Von Hofe et al. | 198/626 |
| 2,673,640 | 3/1954 | Temple | 198/817 |
| 3,009,572 | 11/1961 | Seaborn | 198/365 |
| 3,056,368 | 10/1962 | Sillars | 198/626 |
| 3,101,836 | 8/1963 | Rountree, Jr. | 198/817 |
| 3,661,243 | 5/1972 | Piatek | 198/475.1 |
| 3,731,782 | 5/1973 | Del Rosso | 198/365 |
| 3,771,640 | 11/1973 | Tobey et al. | 198/440 |
| 4,138,008 | 2/1979 | Del Rosso | 198/365 |
| 4,287,980 | 9/1981 | Montferme | 198/440 |
| 4,449,624 | 5/1984 | Lemaire et al. | 198/440 |
| 4,508,206 | 4/1985 | Moore et al. | 198/365 |

FOREIGN PATENT DOCUMENTS

| | | | |
|---|---|---|---|
| 2912298 | 12/1979 | Fed. Rep. of Germany | 198/440 |
| 1206268 | 2/1960 | France | 198/627 |

Primary Examiner—Robert J. Spar
Assistant Examiner—Daniel R. Alexander
Attorney, Agent, or Firm—Guido Modiano; Albert Josif

[57] ABSTRACT

The apparatus comprises two superimposed conveyors the adjacent runs whereof move at the same speed in the same direction. The conveyors are provided with transverse guides on which sliding elements are mounted which provide support for the articles, in connection with the bottom conveyor, and clamp the articles against the underlying supporting elements, in connection with the top conveyor, the held articles being caused to advance past switches operated in succession to divert the articles along guide sets leading to respective removal belts.

1 Claim, 4 Drawing Figures

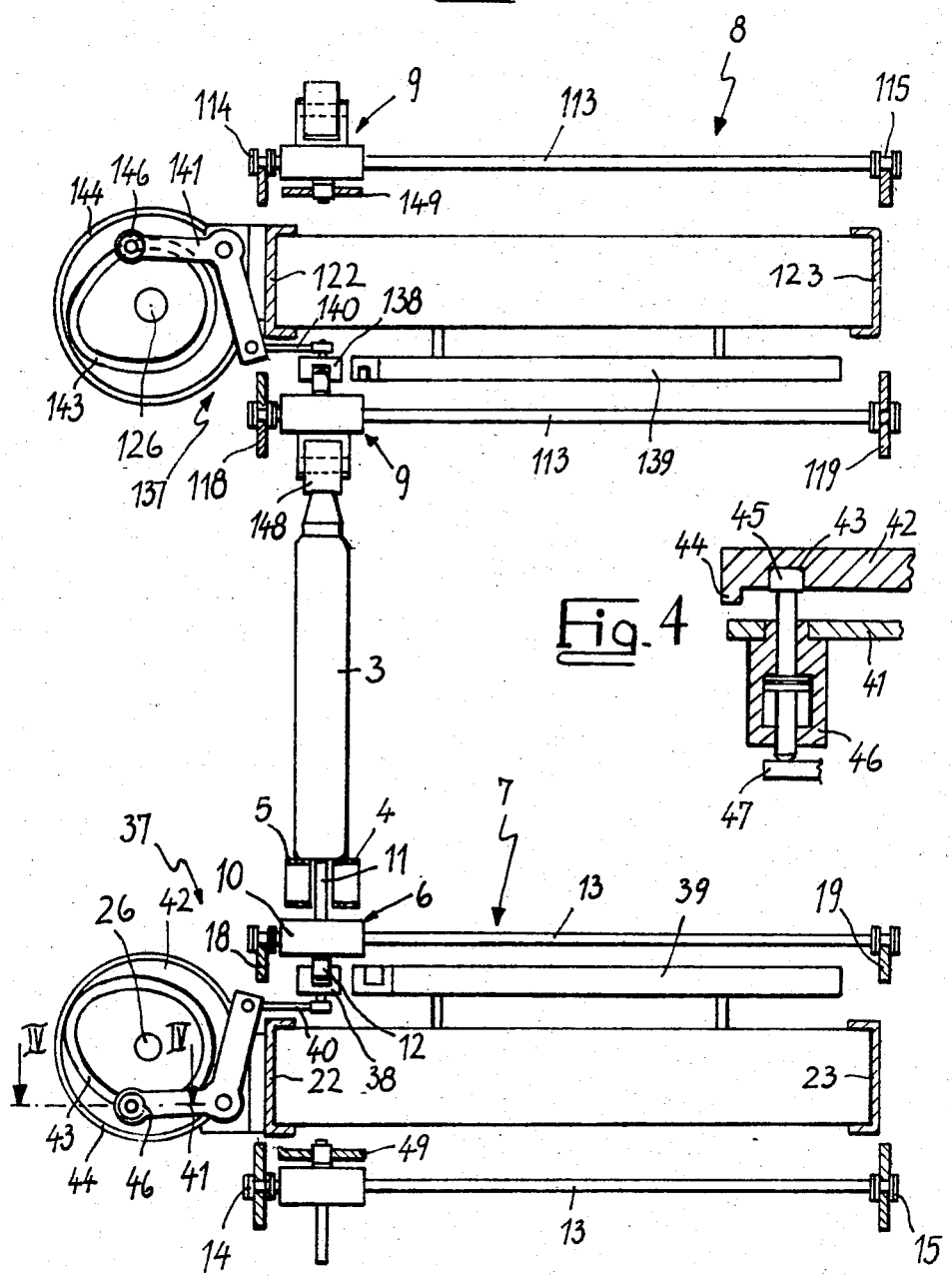

4,632,238

APPARATUS FOR ARRANGING ONCOMING ARTICLES, IN PARTICULAR CONTAINERS, INTO PLURAL ARTICLE ROWS

BACKGROUND OF THE INVENTION

This invention relates to an apparatus for arranging oncoming articles, in particular containers, into plural rows.

Apparatus of this kind are already employed in the packaging industry. They are adapted to handle objects having symmetrical features which do not impede grouping in parallel rows. Where, however, the objects have asymmetrical shapes or are formed from a readily deformable material, special measures must be taken which complicate the apparatus design and cut down substantially its throughput.

SUMMARY OF THE INVENTION

Accordingly, the task of this invention is to provide an apparatus which can separate in multiple rows articles having any shapes and being formed from a material which may be other than a stiff one provided that it is self-supporting.

Within that task it is an object of this invention to provide an apparatus which is highly reliable in operation and versatile in application, thereby it may be used to orderly arrange articles having different shapes and sizes.

According to one aspect of the invention, the above task and objects are achieved by an apparatus for arranging oncoming articles, in particular containers, into plural article rows, characterized in that it comprises a pair of superimposed conveyors driven horizontally and having transversely extending guides slidably accommodating article supporting and clamping elements thereon which are operative to engage each individual article at the top and bottom, and controllable switch members arranged aligned to said conveyors and being controlled to divert said supporting and clamping elements holding said articles along a plurality of guides each leading to a receiving deck whereon said articles are orderly arranged in rows.

BRIEF DESCRIPTION OF THE DRAWINGS

Further advantages and features of this invention will be more clearly understood from the following description of a preferred embodiment thereof to be read in conjunction with the accompanying illustrative drawings, where:

FIG. 3 is a sectional view taken in the plane of line III—III of FIG. 1 and shown to an enlarged scale; and FIG. 4 is a cross-sectional view taken along the line IV—IV of FIG. 3.

DESCRIPTION OF THE PREFERRED EMBODIMENTS

Figure 1:
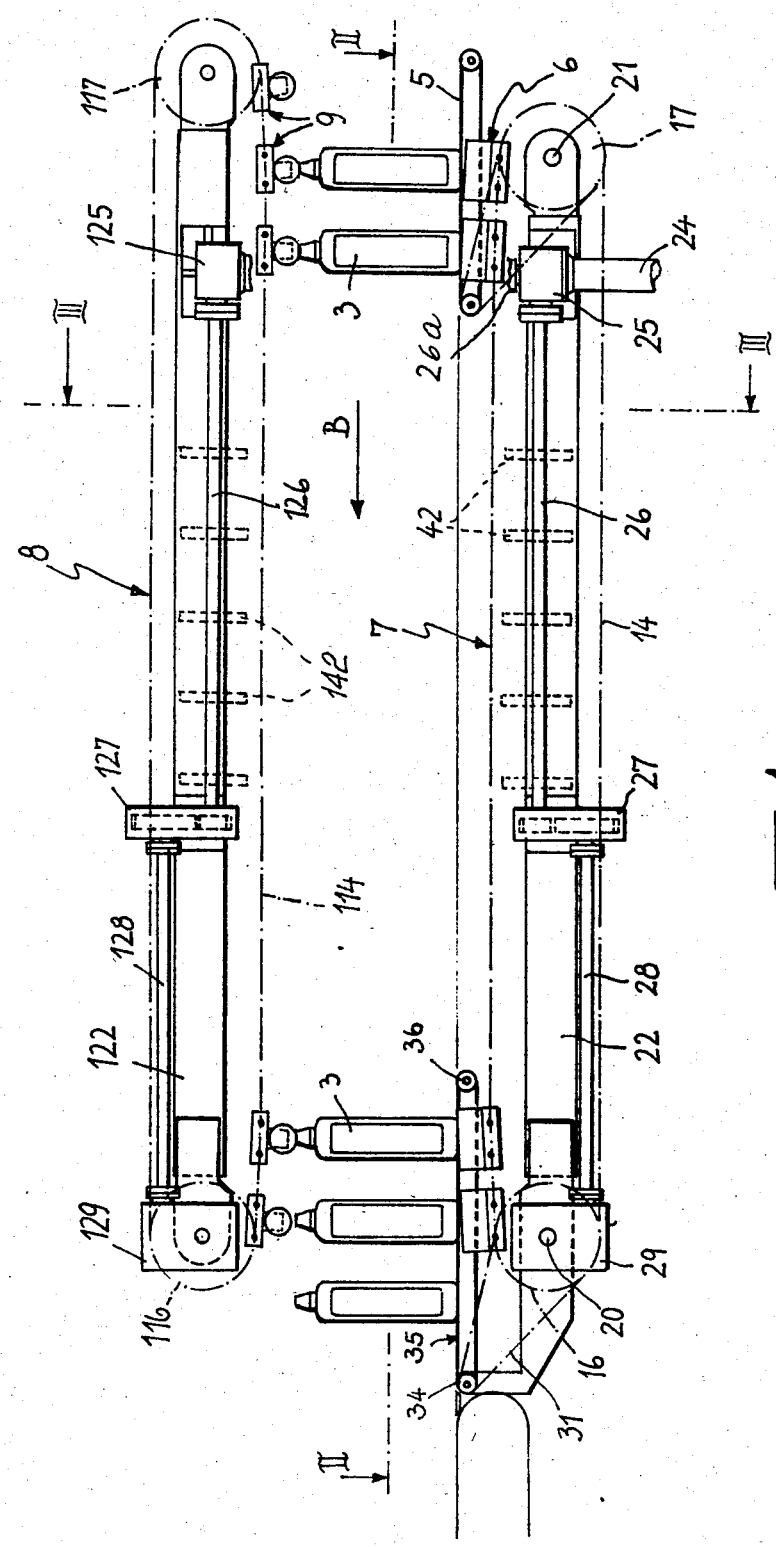
FIG. 1 is a partly schematical side elevation view of an apparatus for arranging containers in parallel rows.
Figure 2:
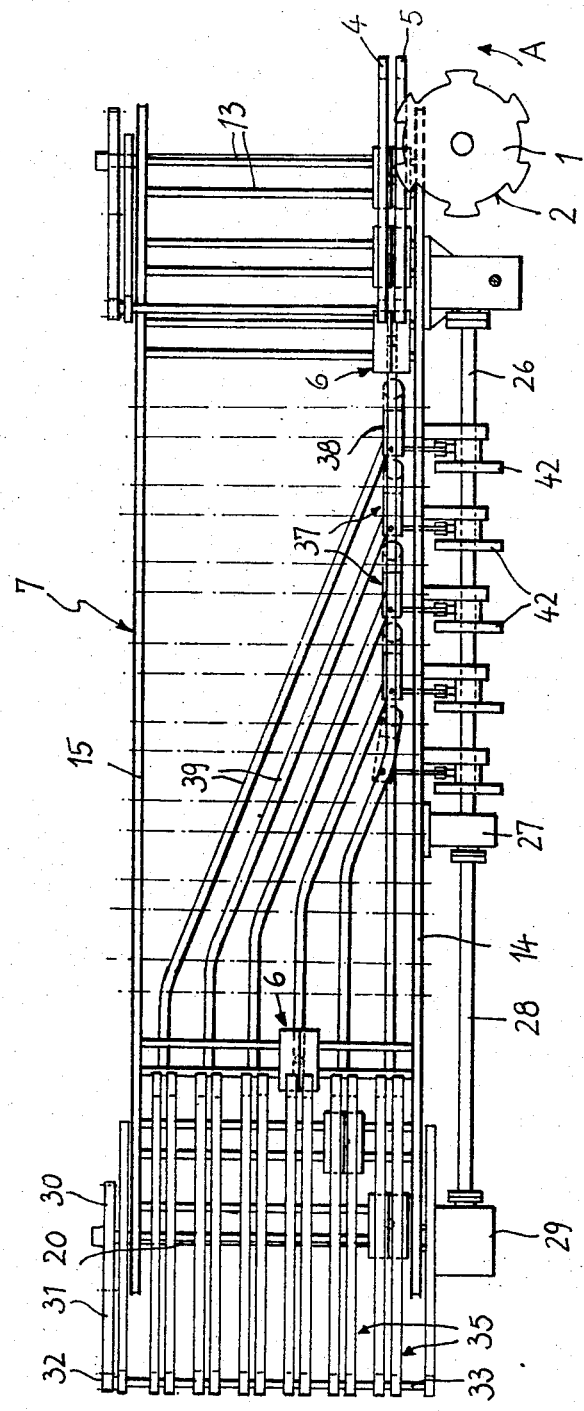
FIG. 2 is a plan view of the apparatus taken in the plane of line II—II of FIG. 1.

Making reference to the drawing views, this apparatus comprises a loading star wheel 1 driven to rotate in the direction A and having peripheral receptacles 2 for accommodating articles therein which are to be arranged in several parallel article rows. In the illustrated embodiment, the articles are containers 3 having a substantially rectangular slightly ovalized cross-section configuration.

The loading star wheel 1 comprises, in a conventional manner, two superimposed discs driven rotatively such that a peripheral portion thereof will overlap a pair of closed loop parallel belts 4, 5 around respective pulleys. The belts 4,5 have at least the upper runs horizontal, and a gap is defined therebetween through which supporting elements for the containers 3 are caused to stand out in succession, which elements are generally designated with the reference numeral 6. The supporting elements 6 are a part of a bottom conveyor 7 cooperating with a top conveyor 8 which carries clamping elements 9. The conveyors 7,8 have adjacent runs both moving in the direction B, and each supporting element 6 is juxtaposed exactly to one clamping element 9 such as to pick up a container and transport it positively in an upright position.

The supporting elements 6 (see FIG. 3) comprise a small block 10 from which there extend a wing or rib 11 outwardly, and a roller 12 inwardly.

The blocks 10 are set sliding on respective guides each comprising a pair of rods 13 extending between a pair of chains 14,15 trained in closed loop configuration around driving sprocket wheels 16 and driven sprocket wheels 17.

The upper runs of the chains 14,15 move along slides or rails 18,19 which have, in the proximities of the wheels 16,17, upward and downward sections, respectively, relative to the direction of advance B. More specifically, the belts 4,5 are positioned above the upward sections, thereby the wings 11 of the supporting elements 6 can stand slightly proud of the plane defined by the belts 4,5 to contact the bottoms of containers being transferred thereto by the loading star wheel 1.

The sprocket wheels 16,17 are keyed to respective shafts 20,21 carried on longitudinal stringers 22,23 incorporated to the apparatus frame. The shaft 20 is connected to a drive shaft 24 through a drive which includes a gearcase 25 having two output shafts 26, 26a. The shaft 26 transmits the motion, via a reduction gear 27, to an additional shaft 28 which is connected by a bevel gear pair 29 to the shaft 20.

Keyed to the shaft 20 end remote from that connected to the bevel gear pair 29, is a sprocket wheel 30 which drives, through a drive chain 31 and pinion 32, a shaft 33 extending parallel to the shaft 20. A plurality of pulley pairs 34 are made rigid with the shaft 33 to entrain respective belt pairs 35 trained in closed loop configuration around idler pulleys 36. The belt pairs 35 form receiving decks for individual container rows.

The belts 35 extend above the end section of the chains 14,15 corresponding to the downward sections of the slides 18,19. Furthermore, the upper sections of the belts 35 are coplanar with the top edge of the wings 11, thereby as the latter move along the downward sections of the slides 18,19, the containers 3 are deposited on the belt pairs 35.

In order to direct the containers 3 toward the individual belt pairs 35, switch members 37 are provided which distribute the flow of oncoming containers along paths, each leading, in fact, to a belt pair 35.

Each switch member includes a diverting needle 38 formed by a length of a U-like sectional member open at the top. The needles 38 are pivoted on the stationary frame at one end and the pivotal points are located along the path of advancement of the wings 11 as the latter leave the belts 4,5.

The needles 38 are controlled to assume either of two positions: in a first position, they are aligned to one another to form a single guide which allows the wings 11 to move in a straight line toward the first belt pair 35 adjacent the gearcase 29; in a second position, the needles 38 assume an inclined orientation to divert, in engagement with the rollers 12, the supporting elements 6 along rails 39, each whereof leads to a respective belt pair 35. The rails 39 have the same U-like cross-section as the needles, and are attached to the frame under the plane defined by the top rods 13.

Each needle 38 is connected, through a connecting rod 40, to a crank lever 41 which is journalled to the stringer 22 through a bracket such as to oscillate in a perpendicular plane to the stringer.

The lever 41 operates as a rocker arm driven by a radial cam 42 keyed to the shaft 26. The cam 42 comprises a groove 43 which extends along a closed loop path having a preset pattern, and a circumferential border 44 which projects sidewards from the groove 43.

The cam 42 and lever 41 are interconnected by a piston rod 45 of a pneumatic cylinder 46 which is flange-connected to the remote end of the lever 41 from that having the connecting rod 44 pivoted thereto. The piston rod 45 is passed axially through the cylinder 46 such that its remote end from the end adjacent the cam 42 is maintained, through a preset oscillation angle of the lever 41, in contact with a fixed detent 47 projecting from the stringer 22. The function served by that fixed detent is to prevent the rod 45 from leaving the groove 43 as a result of a malfunction in the control circuitry, as explained hereinafter.

To now describe the conveyor 8 and members associated therewith, it should be noted that they are a mirror image of those just described in connection with the conveyor 7, thereby they are designated hereinafter, for brevity, with the same reference numerals increased by 100. The only differences are that the conveyor 8 has a length, at an upstream location, which exceeds that of the conveyor 7, thereby the clamping elements 9, comprising plugs 148 of an elastic material, contact the tops of the containers 3 prior to the latter contacting with their bottoms the wings 11 of the supporting elements 6. The superimposition of the clamping elements 9 on the tops of the containers 3 is provided by initially descending portions of the slides 118,119 wherealong the chains 114,115 are driven slidingly, while the containers are released along a descending portion of said slides in the proximities of the driving wheels for the conveyor 8.

For driving the chains 114,115, a cardan shaft (not shown in the drawings) is provided to connect the output shaft 26a to the gearcase 125, whence the shaft 126 extends which has the driving cams 142 for the upper switch needles keyed thereto.

The apparatus described hereinabove operates as follows.

Oncoming containers 3 are transferred by the loading star wheel 1 onto the belts 4,5 in timed relationship with the supporting elements 6 and clamping elements 9 of the conveyors 7,8. As mentioned above, the containers are first engaged by the clamping elements 9, thereafter the supporting elements 6 are operated to clamp the containers against the plugs 148 with their wings 11 standing proud of the plane containing the belts 4,5. It should be noted that the elements 6 and 9 are guided between the belts 4,5 by means of guides between which the rollers 12, 112 associated with said elements are caused to run.

After leaving the belts 4,5, the containers are driven further in a straight line until they are diverted by the switch needles 38,138 along the guides 39, 139 toward the belt pairs 35. The switch needles are controlled sequentially to evenly distribute the flow of oncoming containers to the belt pairs 35. To this aim, the small cylinders 45,46 are controlled by a suitable electronics such that the piston rods of the small pneumatic cylinders, in engaging with the grooves 43,143, establish a kinematic connection between the cams 42,142 and levers 41,141 to result in the respective needles being actuated.

The cylinders would be expediently controlled by container detectors which can ensure a perfect distribution toward the belts 35 even where the flow of oncoming containers is not an even one.

As the containers come to the end sections of the conveyors 7,8, the diverging pattern of the slides 18, 118 enables separation of the supporting and clamping elements, 6 and 9, from the tops and bottoms, respectively, of the containers, which can thus move further on the belts 35 toward a removal belt or other apparatus.

It should be noted that the return movement of the supporting and clamping elements to their aligned positions with the switch needles 38,138 is produced by rails 49,149 extending obliquely along the return path of the conveyors and contacting the rollers 12, 112 to shift the elements 6,9 sidewards.

A basic feature of the invention is that the containers, during their transporting, are never left to themselves but are positively controlled such as to avoid malfunctions due to an article build-up.

Furthermore, this apparatus enables articles having any shapes to be arranged in multiple rows. The articles, being prevented from contacting one another, cannot suffer damage. A further advantage afforded by this apparatus is that the containers can be arranged in a scheduled number of rows selected from the available ones.

I claim:

1. An apparatus for arranging oncoming articles, in particular containers, into plural article rows, comprising
    a top conveyor and a bottom conveyor having superimposed adjacent portions moving in the same direction and each provided with transversally extending guides,
    article supporting top and bottom elements slidably mounted on the guides of said top and bottom conveyors respectively and operative to engage each individual article at the top and bottom,
    said adjacent portions having converging initial sections and diverging end sections to cause juxtaposed ones of said supporting and clamping elements to move to and away from each other for holding and releasing the articles,
    a pair of parallel belts arranged at the initial section of said bottom conveyor and a plurality of receiving decks each comprising a pair of parallel belts arranged at the end section of said bottom conveyor, the belts of each pair defining a gap permitting said support elements to move between them for engaging the articles along said converging section and for releasing the articles on said receiving decks,
    a plurality of guide members each leading to a respective receiving deck,
    controllable switch members arranged aligned to said pair of parallel belts forming said initial section, means for controlling each said switch member and diverting said supporting and clamping elements holding said articles along said guide members, each said switch member comprising a diverting needle pivoted at one end and said control means comprising a two arm lever pivotally supported rocker arm-fashion, a radial cam, means for driving said radial cam, a rod connecting said needle to one arm of said lever and a pneumatic cylinder mounted on the opposite arm of said lever and having a piston rod operative to engage said radial cam.

* * * * *